(No Model.)
J. MOTHERAL.
HOISTING DEVICE.
No. 497,592.    Patented May 16, 1893.
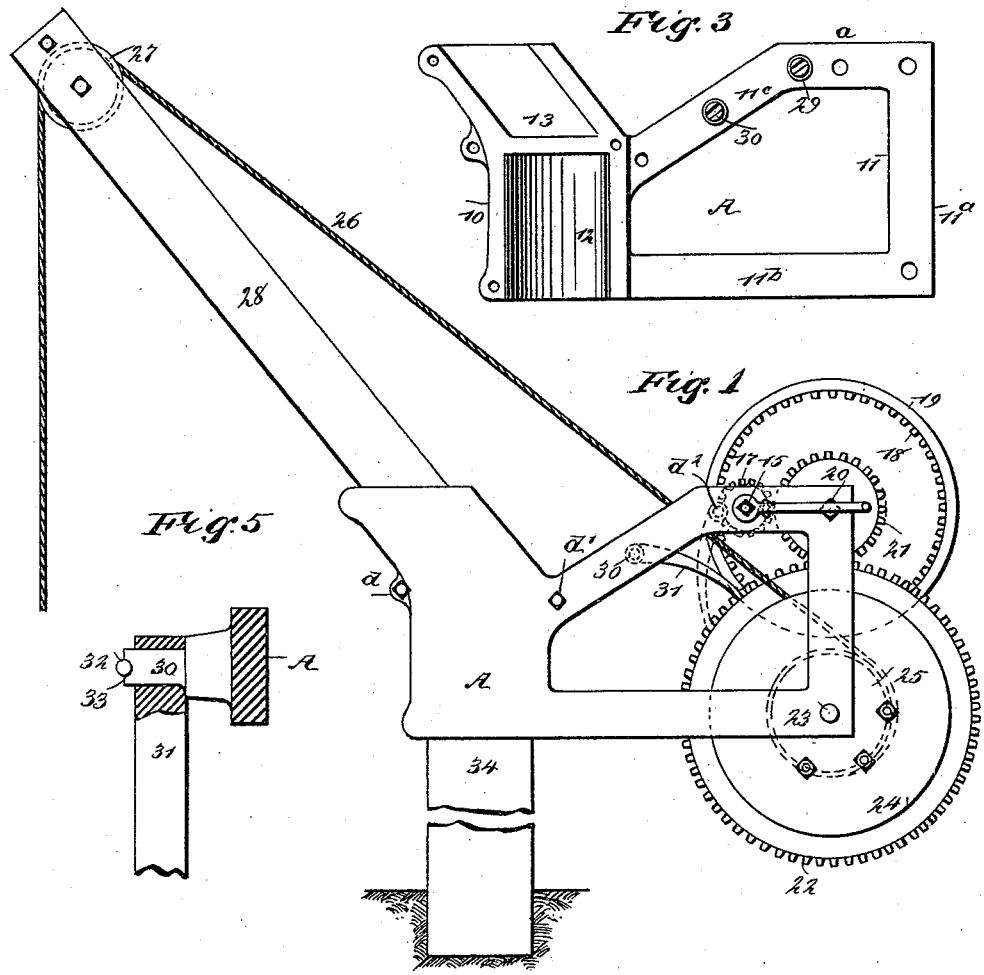
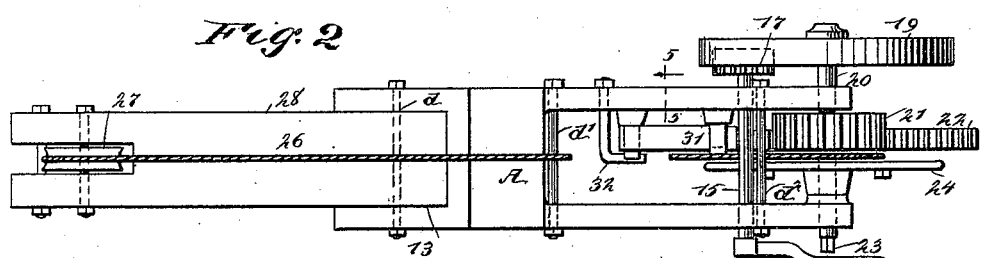
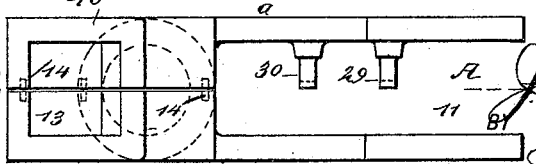
WITNESSES:
J. A. Bergstrom
C. Sedgwick
INVENTOR
J. Motheral
By
Munn & Co.
ATTORNEYS.
THE NORRIS PETERS CO., PHOTO-LITHO., WASHINGTON, D. C.

UNITED STATES PATENT OFFICE.

JOHN MOTHERAL, OF MENDON, NEAR NORTH McGREGOR, IOWA.

HOISTING DEVICE.

SPECIFICATION forming part of Letters Patent No. 497,592, dated May 16, 1893.

Application filed February 28, 1893. Serial No. 464,001. (No model.)

*To all whom it may concern:*

Be it known that I, JOHN MOTHERAL, of Mendon township, near North McGregor, in the county of Clayton and State of Iowa, have invented a new and Improved Derrick for Hoisting, Grubbing, &c., of which the following is a full, clear, and exact description.

My invention relates to an improved derrick capable of being used for hoisting purposes, or various purposes to which an ordinary derrick may be applied, and also capable of use for grubbing or stump pulling on a farm.

The special object of the invention is to improve upon the construction of similar devices for which Letters Patent were granted to myself December 4, 1877, No. 197,790, and May 11, 1880, No. 227,442.

The improved device is so constructed that it may be mounted upon a post for use as a derrick, or upon a stump or grub when it is to be employed for grubbing.

It is a further object of the invention to construct the machine or device in such manner that the derrick arm may be removed from the body and expeditiously and effectively stepped therein either before or after the body of the machine has been mounted upon its support.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of the machine illustrating its application as a derrick. Fig. 2 is a plan view thereof. Fig. 3 is an inner side elevation of one of the body sections. Fig. 4 is a plan view of the body of the machine; and Fig. 5 is a cross section on the line 5—5 in Fig. 2.

The body A of the machine is preferably made in two sections $a$ and $a'$, the sections being practically identical in shape. Each section is formed upon its inner face as shown in Fig. 3, its outer face being preferably smooth, and each section comprises a socket member 10 and a frame or wing member 11. The socket member is formed of two sockets, a lower straight socket 12 and an upper socket 13, the upper socket being inclined upwardly and forwardly. The lower socket is preferably made circular in cross section while the upper socket is given a polygonal cross sectional shape. The wing or frame member 11 is of skeleton form in order that it may be as light as possible, and is somewhat irregular in shape, and comprises a front upright bar $11^a$, which is straight, a horizontal or lower bar $11^b$, also straight, and an upper angular bar $11^c$. The latter bar is straight where it connects with the upright forward bar $11^a$, but inclined downward and rearwardly to a connection with the socket member, the lower straight bar $11^b$ likewise connecting with that member. The socket member is much thicker than the frame or wing member 11; consequently the latter member is stepped back some distance from the inner face of the former member.

The two body sections $a$ and $a'$, are connected by means of dowels 14, as shown in Fig. 4, carried by the socket section, the dowels being secured to one body section and adapted to enter openings in the opposing section. The sections of the body frame are likewise connected by means of bolts located at any suitable point. In the drawings three bolts are shown, designated respectively as $d$, $d'$ and $d^2$.

In the upper portion of the wing members of the body frame a drive shaft 15, is journaled, which shaft is provided at one end with a crank arm 16 by means of which it is turned, and it carries at its opposite end a pinion 17. The pinion meshes with an internal gear 18, produced upon the inner peripheral surface of a fly wheel 19, the latter being mounted upon a line shaft 20, journaled in the upward forward portion of the wing member of the frame, as shown in both Figs. 1 and 2. The shaft 20, is provided between the members of the frame with a small gear 21 rigidly secured upon it, and this small gear meshes with a large drum gear 22, secured upon a shaft 23, parallel with the upper shaft 20 and located in the bottom portion of the frame. The shaft 23, is further provided at one side of the drum gear with a flange 24, firmly attached to it; and between the flange and the gear 22 a cylinder 25, is located, which is bolted to the flange 24 and may be likewise attached to the gear 22. Thus the gear, cylinder and flange virtually constitute a drum. A hoist rope 26, is attached to this drum, and is adapted to be wound around it either in direction of the front or rear of the machine, according to the direction in which the drive shaft 15, is revolved. The hoist rope after leaving the drum is passed over a guide pulley 27, mounted in the upper end of the derrick arm 28, and this derrick arm is stepped or located in the upper inclined socket 13, from which it may be removed whenever it may be found desirable.

Upon one of the body frame sections, the right-hand section $a$, for example, two studs 29 and 30 are cast or otherwise formed, and upon either of these studs a pawl 31 may be mounted. When the machine is to be used as a derrick for hoisting purposes the pawl is mounted upon the stud 30, or the one nearest the rear of the machine, or the socket portion thereof, as shown in positive lines in Figs. 1 and 2; while if the machine is to be used for grubbing, the pawl is placed upon the forward or upper stud 29; but no matter how the pawl is located it is adapted to engage with the teeth of the drum, serving to permit the drum to turn in one direction only. When the position of the pawl is reversed the position of the crank 16, is likewise changed, as when the machine is used as a derrick the operator will stand facing the derrick arm, while when used for grubbing the position of the operator will be such that his back will be toward the derrick arm.

In Fig. 5 I have shown a detail view of one of the studs upon which the pawl is fulcrumed; and in Fig. 2 a locking bolt 32, is illustrated, used in connection with the studs. Each stud has produced in its inner end a recess or cavity 33, and when the pawl is placed upon the stud the inner member of the bolt 32, which is angular or L-shaped, is made to enter the socket 33, while the body of the bolt is secured in the body frame of the machine. The bolt may be transferred from one stud to the other as occasion may demand.

In setting up the machine for use its lower socket 12 is made to receive a post 34, driven in the ground to a suitable depth, or a grub, of the standing broken trunk of a tree may be shaped in such manner that it will enter the socket 12 and support the machine. By removing the derrick arm 28, the machine may be readily transported from place to place, or stored away in a small compass. As the socket 12 may be fitted to a post or stump, the device is free to turn in any direction and may be made to reach to any point desired.

Having thus described my invention, I claim as new and desire to secure by Letters Patent—

1. In a derrick for hoisting, grubbing, &c., the combination, with a body comprising two opposing wing sections and a socket section connected therewith, the socket section being provided with a lower straight socket and an upper inclined socket, of a winding drum journaled in the wings, a driving mechanism connected with the drum, a derrick arm loosely fitted in the upper inclined socket, and a hoist rope passed through the winding drum over a guide pulley in the derrick arm, the body being supported by a convenient post entering the lower straight socket of the socket section, as and for the purpose set forth.

2. In a derrick for hoisting, grubbing, &c., the combination, with a body comprising a socket section and spaced wing sections projected therefrom, the socket section containing a lower straight socket and an upper outwardly and upwardly inclined socket, the latter socket being polygonal in cross section, of a winding drum located between the wings of the frame, a driving mechanism connected with the drum, studs located upon the frame, a pawl adapted to be fitted over either stud, a removable locking device engaging with the pawl-carrying stud, the pawl being in locking engagement with the drum gear, a derrick arm located in the inclined socket of the socket section of the body, provided with a guide pulley, and a hoist rope led over the guide pulley of the derrick arm and connected with the hoisting drum, as and for the purpose specified.

JOHN MOTHERAL.

Witnesses:
C. I. LEWIS,
GUS ANDERSON.